United States Patent
Pan

(10) Patent No.: US 8,121,401 B2
(45) Date of Patent: Feb. 21, 2012

(54) METHOD FOR REDUCING ENHANCEMENT OF ARTIFACTS AND NOISE IN IMAGE COLOR ENHANCEMENT

(75) Inventor: Hao Pan, Camas, WA (US)

(73) Assignee: Sharp Labortories of America, Inc., Camas, WA (US)

( * ) Notice: Subject to any disclaimer, the term of this patent is extended or adjusted under 35 U.S.C. 154(b) by 1049 days.

(21) Appl. No.: 11/393,461

(22) Filed: Mar. 30, 2006

(65) Prior Publication Data
US 2007/0172118 A1    Jul. 26, 2007

Related U.S. Application Data

(60) Provisional application No. 60/762,205, filed on Jan. 24, 2006.

(51) Int. Cl.
G06K 9/00    (2006.01)
(52) U.S. Cl. ........................................ 382/162
(58) Field of Classification Search .................... 382/162
See application file for complete search history.

(56) References Cited

U.S. PATENT DOCUMENTS

| | | |
|---|---|---|
| 3,329,474 A | 7/1967 | Harris et al. |
| 3,375,052 A | 3/1968 | Kosanke et al. |
| 3,428,743 A | 2/1969 | Hanlon |
| 3,439,348 A | 4/1969 | Harris et al. |
| 3,499,700 A | 3/1970 | Harris at al. |
| 3,503,670 A | 3/1970 | Kosanke et al. |
| 3,554,632 A | 1/1971 | Chitayat |
| 3,947,227 A | 3/1976 | Granger et al. |
| 4,012,116 A | 3/1977 | Yevick |
| 4,110,794 A | 8/1978 | Lester et al. |
| 4,170,771 A | 10/1979 | Bly |
| 4,187,519 A | 2/1980 | Vitols et al. |
| 4,384,336 A | 5/1983 | Frankle et al. |
| 4,385,806 A | 5/1983 | Fergason |
| 4,410,238 A | 10/1983 | Hanson |
| 4,441,791 A | 4/1984 | Hornbeck |

(Continued)

FOREIGN PATENT DOCUMENTS
EP    0 732 669 A1    9/1996
(Continued)

OTHER PUBLICATIONS

Lubin, J., "Adaptive coring techniques for spatio-temporal signals," Visual Motion, 1991., Proceedings of the IEEE Workshop on , vol., No., pp. 333-339, Oct. 7-9, 1991 URL: http://ieeexplore.ieee.org/stamp/stamp.jsp?arnumber=212767&isnumber=5559.*

(Continued)

*Primary Examiner* — Brian Werner
*Assistant Examiner* — Nirav G Patel
(74) *Attorney, Agent, or Firm* — Chernoff Vilhauer McClung & Stenzel LLP

(57) ABSTRACT

A method for enhancing the color of an image to be displayed on a display includes receiving an image having a plurality of pixels where each of the pixels has a plurality of color components. The image is filtered using a spatial filter in such a manner that the lower frequency content of the image is enhanced in such a manner that the dynamic range of the lower frequency content is increased. The filtered image is modified such that the higher frequency content of the image to obtain a modified image that includes the higher frequency content and the lower frequency content.

8 Claims, 5 Drawing Sheets

The block diagram of two-channel decomposition color enhancement

U.S. PATENT DOCUMENTS

| | | |
|---|---|---|
| 4,516,837 A | 5/1985 | Soref et al. |
| 4,540,243 A | 9/1985 | Fergason |
| 4,562,433 A | 12/1985 | Biferno |
| 4,574,364 A | 3/1986 | Tabata et al. |
| 4,611,889 A | 9/1986 | Buzak |
| 4,648,691 A | 3/1987 | Oguchi et al. |
| 4,649,425 A | 3/1987 | Pund |
| 4,682,270 A | 7/1987 | Whitehead et al. |
| RE32,521 E | 10/1987 | Fergason |
| 4,715,010 A | 12/1987 | Inoue et al. |
| 4,719,507 A | 1/1988 | Bos |
| 4,755,038 A | 7/1988 | Baker |
| 4,758,818 A | 7/1988 | Vatne |
| 4,766,430 A | 8/1988 | Gillette et al. |
| 4,834,500 A | 5/1989 | Hilsum et al. |
| 4,862,270 A | 8/1989 | Nishio |
| 4,862,496 A | 8/1989 | Kelly et al. |
| 4,885,783 A | 12/1989 | Whitehead et al. |
| 4,888,690 A | 12/1989 | Huber |
| 4,910,413 A | 3/1990 | Tamune |
| 4,917,452 A | 4/1990 | Liebowitz |
| 4,918,534 A | 4/1990 | Lam et al. |
| 4,933,754 A | 6/1990 | Reed et al. |
| 4,954,789 A | 9/1990 | Sampsell |
| 4,958,915 A | 9/1990 | Okada et al. |
| 4,969,717 A | 11/1990 | Mallinsoh |
| 4,981,838 A | 1/1991 | Whitehead |
| 4,991,924 A | 2/1991 | Shankar et al. |
| 5,012,274 A | 4/1991 | Dolgoff |
| 5,013,140 A | 5/1991 | Healey et al. |
| 5,074,647 A | 12/1991 | Fergason et al. |
| 5,075,789 A | 12/1991 | Jones et al. |
| 5,083,199 A | 1/1992 | Borner |
| 5,122,791 A | 6/1992 | Gibbons et al. |
| 5,128,782 A | 7/1992 | Wood |
| 5,138,449 A | 8/1992 | Kerpchar |
| 5,144,292 A | 9/1992 | Shiraishi et al. |
| 5,164,829 A | 11/1992 | Wada |
| 5,168,183 A | 12/1992 | Whitehead |
| 5,187,603 A | 2/1993 | Bos |
| 5,202,897 A | 4/1993 | Whitehead |
| 5,206,633 A | 4/1993 | Zalph |
| 5,214,758 A | 5/1993 | Ohba et al. |
| 5,222,209 A | 6/1993 | Murata et al. |
| 5,224,178 A | 6/1993 | Madden et al. |
| 5,247,366 A | 9/1993 | Ginosar et al. |
| 5,256,676 A | 10/1993 | Hider et al. |
| 5,293,258 A | 3/1994 | Dattilo |
| 5,300,942 A | 4/1994 | Dolgoff |
| 5,305,146 A | 4/1994 | Nakagaki et al. |
| 5,311,217 A | 5/1994 | Guerin et al. |
| 5,313,225 A | 5/1994 | Miyadera |
| 5,313,454 A | 5/1994 | Bustini et al. |
| 5,317,400 A | 5/1994 | Gurley et al. |
| 5,337,068 A | 8/1994 | Stewart et al. |
| 5,339,382 A | 8/1994 | Whitehead |
| 5,357,369 A | 10/1994 | Pilling et al. |
| 5,359,345 A | 10/1994 | Hunter |
| 5,369,266 A | 11/1994 | Nohda et al. |
| 5,369,432 A | 11/1994 | Kennedy |
| 5,386,253 A | 1/1995 | Fielding |
| 5,394,195 A | 2/1995 | Herman |
| 5,395,755 A | 3/1995 | Thorpe et al. |
| 5,416,496 A | 5/1995 | Wood |
| 5,422,680 A | 6/1995 | Lagoni et al. |
| 5,426,312 A | 6/1995 | Whitehead |
| 5,436,755 A | 7/1995 | Gueria |
| 5,450,498 A | 9/1995 | Whitehead |
| 5,456,255 A | 10/1995 | Abe et al. |
| 5,461,397 A | 10/1995 | Zhang et al. |
| 5,471,225 A | 11/1995 | Parks |
| 5,471,228 A | 11/1995 | Ilcisin et al. |
| 5,477,274 A | 12/1995 | Akiyoshi et al. |
| 5,481,637 A | 1/1996 | Whitehead |
| 5,537,128 A | 7/1996 | Keene et al. |
| 5,570,210 A | 10/1996 | Yoshida et al. |
| 5,579,134 A | 11/1996 | Lengyel |
| 5,580,791 A | 12/1996 | Thorpe et al. |
| 5,592,193 A | 1/1997 | Chen |
| 5,617,112 A | 4/1997 | Yoshida et al. |
| 5,642,015 A | 6/1997 | Whitehead et al. |
| 5,642,128 A | 6/1997 | Inoue |
| D381,355 S | 7/1997 | Frank-Braun |
| 5,650,880 A | 7/1997 | Shuter et al. |
| 5,652,672 A | 7/1997 | Huignard et al. |
| 5,661,839 A | 8/1997 | Whitehead |
| 5,682,075 A | 10/1997 | Bolleman et al. |
| 5,684,354 A | 11/1997 | Gleckman |
| 5,689,283 A | 11/1997 | Shirochi |
| 5,715,347 A | 2/1998 | Whitehead |
| 5,717,421 A | 2/1998 | Katakura et al. |
| 5,717,422 A | 2/1998 | Fergason |
| 5,729,242 A | 3/1998 | Margerum et al. |
| 5,748,164 A | 5/1998 | Handschy et al. |
| 5,751,264 A | 5/1998 | Cavallerano et al. |
| 5,754,159 A | 5/1998 | Wood et al. |
| 5,767,828 A | 6/1998 | McKnight |
| 5,767,837 A | 6/1998 | Hara |
| 5,774,599 A | 6/1998 | Muka et al. |
| 5,784,181 A | 7/1998 | Loiseaux et al. |
| 5,796,382 A | 8/1998 | Beeteson |
| 5,809,169 A | 9/1998 | Rezzouk et al. |
| 5,854,662 A | 12/1998 | Yuyama et al. |
| 5,886,681 A | 3/1999 | Walsh et al. |
| 5,889,567 A | 3/1999 | Swanson et al. |
| 5,892,325 A | 4/1999 | Gleckman |
| 5,892,850 A * | 4/1999 | Tsuruoka ..................... 382/240 |
| 5,901,266 A | 5/1999 | Whitehead |
| 5,912,651 A | 6/1999 | Bitzakidis et al. |
| 5,939,830 A | 8/1999 | Praiswater |
| 5,940,057 A | 8/1999 | Lien et al. |
| 5,959,777 A | 9/1999 | Whitehead |
| 5,969,704 A | 10/1999 | Green et al. |
| 5,978,142 A | 11/1999 | Blackham et al. |
| 5,986,628 A | 11/1999 | Tuenge et al. |
| 5,991,456 A | 11/1999 | Rahman et al. |
| 5,995,070 A | 11/1999 | Kitada |
| 5,999,307 A | 12/1999 | Whitehead et al. |
| 6,008,929 A | 12/1999 | Akimoto et al. |
| 6,024,462 A | 2/2000 | Whitehead |
| 6,025,583 A | 2/2000 | Whitehead |
| 6,043,591 A | 3/2000 | Gleckman |
| 6,050,704 A | 4/2000 | Park |
| 6,064,784 A | 5/2000 | Whitehead et al. |
| 6,067,645 A | 5/2000 | Yamamoto et al. |
| 6,079,844 A | 6/2000 | Whitehead et al. |
| 6,111,559 A | 8/2000 | Motomura et al. |
| 6,111,622 A | 8/2000 | Abileah |
| 6,120,588 A | 9/2000 | Jacobson |
| 6,120,839 A | 9/2000 | Comiskey et al. |
| 6,129,444 A | 10/2000 | Tognoni |
| 6,160,595 A | 12/2000 | Kishimoto |
| 6,172,798 B1 | 1/2001 | Albert et al. |
| 6,211,851 B1 | 4/2001 | Lien et al. |
| 6,215,920 B1 | 4/2001 | Whitehead et al. |
| 6,232,948 B1 | 5/2001 | Tsuchi |
| 6,243,068 B1 | 6/2001 | Evanicky et al. |
| 6,267,850 B1 | 7/2001 | Bailey et al. |
| 6,268,843 B1 | 7/2001 | Arakawa |
| 6,276,801 B1 | 8/2001 | Fielding |
| 6,300,931 B1 | 10/2001 | Someya et al. |
| 6,300,932 B1 | 10/2001 | Albert |
| 6,304,365 B1 | 10/2001 | Whitehead |
| 6,323,455 B1 | 11/2001 | Bailey et al. |
| 6,323,989 B1 | 11/2001 | Jacobsen et al. |
| 6,327,072 B1 | 12/2001 | Comiskey et al. |
| RE37,594 E | 3/2002 | Whitehead |
| 6,359,662 B1 | 3/2002 | Walker |
| 6,377,383 B1 | 4/2002 | Whitehead et al. |
| 6,384,979 B1 | 5/2002 | Whitehead et al. |
| 6,400,436 B1 | 6/2002 | Komatsu |
| 6,414,664 B1 | 7/2002 | Conover et al. |
| 6,418,253 B2 | 7/2002 | Whitehead |
| 6,424,369 B1 | 7/2002 | Adair et al. |
| 6,428,189 B1 | 8/2002 | Hochstein |
| 6,435,654 B1 | 8/2002 | Wang et al. |
| 6,437,921 B1 | 8/2002 | Whitehead |

| Patent Number | Date | Inventor |
|---|---|---|
| 6,439,731 B1 | 8/2002 | Johnson et al. |
| 6,448,944 B2 | 9/2002 | Ronzani et al. |
| 6,448,951 B1 | 9/2002 | Sakaguchi et al. |
| 6,448,955 B1 | 9/2002 | Evanicky et al. |
| 6,452,734 B1 | 9/2002 | Whitehead et al. |
| 6,483,643 B1 | 11/2002 | Zuchowski |
| 6,507,327 B1 | 1/2003 | Atherton et al. |
| 6,545,677 B2 | 4/2003 | Brown |
| 6,559,827 B1 | 5/2003 | Mangerson |
| 6,559,886 B1* | 5/2003 | Miyahara .................. 348/226.1 |
| 6,573,928 B1 | 6/2003 | Jones et al. |
| 6,574,025 B2 | 6/2003 | Whitehead et al. |
| 6,590,561 B1 | 7/2003 | Kabel et al. |
| 6,597,339 B1 | 7/2003 | Ogawa |
| 6,608,614 B1 | 8/2003 | Johnson |
| 6,624,828 B1 | 9/2003 | Dresevic et al. |
| 6,657,607 B1 | 12/2003 | Evanicky et al. |
| 6,680,834 B2 | 1/2004 | Williams |
| 6,690,383 B1 | 2/2004 | Braudaway et al. |
| 6,697,110 B1 | 2/2004 | Jaspers et al. |
| 6,700,559 B1 | 3/2004 | Tanaka et al. |
| 6,753,876 B2 | 6/2004 | Brooksby et al. |
| 6,788,280 B2 | 9/2004 | Ham |
| 6,791,520 B2 | 9/2004 | Choi |
| 6,803,901 B1 | 10/2004 | Numao |
| 6,816,141 B1 | 11/2004 | Fergason |
| 6,816,142 B2 | 11/2004 | Oda et al. |
| 6,816,262 B1 | 11/2004 | Slocum et al. |
| 6,828,816 B2 | 12/2004 | Ham |
| 6,834,125 B2 | 12/2004 | Woodell et al. |
| 6,846,098 B2 | 1/2005 | Bourdelais et al. |
| 6,856,449 B2 | 2/2005 | Winkler et al. |
| 6,862,012 B1 | 3/2005 | Funakoshi et al. |
| 6,864,916 B1 | 3/2005 | Nayar et al. |
| 6,885,369 B2 | 4/2005 | Tanahashi et al. |
| 6,891,672 B2 | 5/2005 | Whitehead et al. |
| 6,900,796 B2 | 5/2005 | Yasunishi et al. |
| 6,932,477 B2 | 8/2005 | Stanton |
| 6,954,193 B1 | 10/2005 | Andrade et al. |
| 6,975,369 B1 | 12/2005 | Burkholder |
| 7,002,546 B1 | 2/2006 | Stuppi et al. |
| 7,113,163 B2 | 9/2006 | Nitta et al. |
| 7,113,164 B1 | 9/2006 | Kurihara |
| 7,123,222 B2 | 10/2006 | Borel et al. |
| 7,161,577 B2 | 1/2007 | Hirakata et al. |
| 2001/0005192 A1 | 6/2001 | Walton et al. |
| 2001/0013854 A1 | 8/2001 | Ogoro |
| 2001/0024199 A1 | 9/2001 | Hughes et al. |
| 2001/0035853 A1 | 11/2001 | Hoelen et al. |
| 2001/0038736 A1 | 11/2001 | Whitehead |
| 2001/0048407 A1 | 12/2001 | Yasunishi et al. |
| 2001/0052897 A1 | 12/2001 | Nakano et al. |
| 2002/0003520 A1 | 1/2002 | Aoki |
| 2002/0003522 A1 | 1/2002 | Baba et al. |
| 2002/0008694 A1 | 1/2002 | Miyachi et al. |
| 2002/0033783 A1 | 3/2002 | Koyama |
| 2002/0036650 A1 | 3/2002 | Kasahara et al. |
| 2002/0044116 A1 | 4/2002 | Tagawa et al. |
| 2002/0057238 A1 | 5/2002 | Nitta et al. |
| 2002/0057253 A1 | 5/2002 | Lim et al. |
| 2002/0063963 A1 | 5/2002 | Whitehead et al. |
| 2002/0067325 A1 | 6/2002 | Choi |
| 2002/0067332 A1 | 6/2002 | Hirakata et al. |
| 2002/0070914 A1 | 6/2002 | Bruning et al. |
| 2002/0093521 A1 | 7/2002 | Daly et al. |
| 2002/0105709 A1 | 8/2002 | Whitehead et al. |
| 2002/0118887 A1* | 8/2002 | Gindele .................. 382/260 |
| 2002/0135553 A1 | 9/2002 | Nagai et al. |
| 2002/0149574 A1 | 10/2002 | Johnson et al. |
| 2002/0149575 A1 | 10/2002 | Moon |
| 2002/0154088 A1 | 10/2002 | Nishimura |
| 2002/0158975 A1* | 10/2002 | Hiroshige et al. ............ 348/242 |
| 2002/0159002 A1 | 10/2002 | Chang |
| 2002/0159692 A1 | 10/2002 | Whitehead |
| 2002/0162256 A1 | 11/2002 | Wardle et al. |
| 2002/0171617 A1 | 11/2002 | Fuller |
| 2002/0175907 A1 | 11/2002 | Sekiya et al. |
| 2002/0180733 A1 | 12/2002 | Colmenarez et al. |
| 2002/0190940 A1 | 12/2002 | Itoh et al. |
| 2003/0012448 A1 | 1/2003 | Kimmel et al. |
| 2003/0026494 A1 | 2/2003 | Woodell et al. |
| 2003/0043394 A1 | 3/2003 | Kuwata et al. |
| 2003/0048393 A1 | 3/2003 | Sayag |
| 2003/0053689 A1 | 3/2003 | Watanabe et al. |
| 2003/0072496 A1 | 4/2003 | Woodell et al. |
| 2003/0090455 A1 | 5/2003 | Daly |
| 2003/0107538 A1 | 6/2003 | Asao et al. |
| 2003/0108245 A1* | 6/2003 | Gallagher et al. ............ 382/228 |
| 2003/0108250 A1* | 6/2003 | Luo et al. .................. 382/263 |
| 2003/0112391 A1 | 6/2003 | Jang et al. |
| 2003/0128337 A1 | 7/2003 | Jaynes et al. |
| 2003/0132905 A1 | 7/2003 | Lee et al. |
| 2003/0142118 A1 | 7/2003 | Funamoto et al. |
| 2003/0169247 A1 | 9/2003 | Kawabe et al. |
| 2003/0179221 A1 | 9/2003 | Nitta et al. |
| 2003/0197709 A1 | 10/2003 | Shimazaki et al. |
| 2004/0012551 A1 | 1/2004 | Ishii |
| 2004/0012720 A1* | 1/2004 | Alvarez .................. 348/607 |
| 2004/0041782 A1 | 3/2004 | Tachibana |
| 2004/0051724 A1 | 3/2004 | Elliott et al. |
| 2004/0057017 A1 | 3/2004 | Childers et al. |
| 2004/0234151 A1* | 11/2004 | Thal et al. .................. 382/254 |
| 2004/0239587 A1 | 12/2004 | Murata et al. |
| 2004/0263450 A1 | 12/2004 | Lee et al. |
| 2005/0073495 A1 | 4/2005 | Harbers et al. |
| 2005/0088403 A1 | 4/2005 | Yamazaki |
| 2005/0152614 A1* | 7/2005 | Daly et al. .................. 382/268 |
| 2005/0157298 A1 | 7/2005 | Evanicky et al. |
| 2005/0190164 A1 | 9/2005 | Velthoven et al. |
| 2005/0200295 A1 | 9/2005 | Lim et al. |
| 2005/0225561 A1 | 10/2005 | Higgins et al. |
| 2005/0225574 A1 | 10/2005 | Brown et al. |
| 2005/0259064 A1 | 11/2005 | Sugino et al. |
| 2005/0281458 A1* | 12/2005 | Adams et al. ............ 382/162 |
| 2006/0071936 A1 | 4/2006 | Leyvi et al. |
| 2006/0104508 A1 | 5/2006 | Daly et al. |
| 2006/0120598 A1 | 6/2006 | Takahashi et al. |
| 2006/0208998 A1 | 9/2006 | Okishiro et al. |
| 2007/0052636 A1 | 3/2007 | Kalt et al. |
| 2008/0025634 A1 | 1/2008 | Border et al. |
| 2008/0088560 A1 | 4/2008 | Bae et al. |

FOREIGN PATENT DOCUMENTS

| | | |
|---|---|---|
| EP | 0 829 747 A1 | 3/1998 |
| EP | 0 606 162 B1 | 11/1998 |
| EP | 0912047 | 4/1999 |
| EP | 0 963 112 A1 | 12/1999 |
| EP | 1168243 | 1/2002 |
| EP | 1 202 244 A1 | 5/2002 |
| EP | 1 206 130 A1 | 5/2002 |
| EP | 1 313 066 A1 | 5/2003 |
| EP | 1 316 919 A2 | 6/2003 |
| EP | 1 453 002 | 9/2004 |
| EP | 1 453 030 A1 | 9/2004 |
| FR | 2 611 389 | 2/1987 |
| GB | 2 388 737 | 11/2003 |
| JP | 3-198026 | 8/1991 |
| JP | 5-273523 | 10/1993 |
| JP | 7-121120 | 5/1995 |
| JP | 9-244548 | 9/1997 |
| JP | 10-508120 | 8/1998 |
| JP | 11-052412 | 2/1999 |
| JP | 2002-099250 | 4/2000 |
| JP | 2000-206488 | 7/2000 |
| JP | 2000-275995 | 10/2000 |
| JP | 2001-142409 | 5/2001 |
| JP | 2002-091385 | 3/2002 |
| JP | 2004-294540 | 10/2004 |
| TW | 406206 | 9/2000 |
| WO | WO 91/15843 | 10/1991 |
| WO | WO 93/20660 | 10/1993 |
| WO | WO 96/33483 | 10/1996 |
| WO | WO 98/08134 | 2/1998 |
| WO | WO 00/75720 | 12/2000 |
| WO | WO 01/69584 | 9/2001 |
| WO | WO 02/03687 | 1/2002 |

| | | |
|---|---|---|
| WO | WO 02/079862 | 10/2002 |
| WO | WO 03/077013 | 9/2003 |
| WO | WO 2004/013835 | 2/2004 |

OTHER PUBLICATIONS

Chung-Hui Kuo; Tewfik, A.H.; , "Active contour based rock sole recognition," Image Processing, 2000. Proceedings. 2000 International Conference on , vol. 2, No., pp. 724-727 vol. 2, Sep. 10-13, 2000 doi: 10.1109/ICIP.2000.899811 URL: http://ieeexplore.ieee.org/stamp/stamp.jsp?tp=&arnumber=899811&isnumber=19473.*

Youngshin Kwak and Lindsay W. MacDonald, "Accurate Prediction of Colours on Liquid Crystal Displays," Colour & Imaging Institute, University of Derby, Derby, United Kingdom, IS&T/SID Ninth Color Imaging Conference, pp. 355-359, Date Unknown.

Fumiaki Yamada and Yoichi Taira, "An LED backlight for color LCD," IBM Research, Tokyo Research Laboratory, 1623-14, Shimotsuruma, Yamato, Kanagawa-ken 242-8502, Japan, IDW'00, pp. 363-366.

A.A.S. Sluyterman and E.P. Boonekamp, "18.2: Architectural Choices in a Scanning Backlight for Large LCD TVs," Philips Lighting, Bld. HBX-p, PO Box 80020, 5600 JM Eindhoven, The Netherlands, SID 05 Digest, pp. 996-999.

Fumiaki Yamada, Hajime Nakamura, Yoshitami Sakaguchi, and Yoichi Taira, "52.2: Invited Paper: Color Sequential LCD Based on OCB with an LED Backlight," Tokyo Research Laboratory, IBM Research, Yamato, Kanagawa, Japan, SID 00 Digest, pp. 1180-1183.

Ngai-Man Cheung, et al., "Configurable entropy coding scheme for H.26L," ITU-Telecommunications Standardization Sector, Study Group 16 Question 6 Video Coding Experts Group (VCEG), Twelfth Meeting: Eibsee, Germany, Jan. 9-12, 2001, pp. 1-11.

T. Funamoto, T. Kobayashi, T. Murao, "High-Picture-Quality Technique for LCD televisions: LCD-AI," AVC Products Development Center, Matsushita Electric Industrial, Co., Ltd., 1-1 Matsushita-cho, Ibaraki, Osaka 567-0026 Japan, 2 pages, date unknown.

Steven L. Wright. et al., "Measurement and Digital compensation of Crosstalk and Photoleakage in High-Resolution TFTLCDs," IBM T.J. Watson Research Center, PO Box 218 MS 10-212, Yorktown Heights, NY 10598, pp. 1-12, date unknown.

Paul E. Debevec and Jitendra Malik, "Recovering High Dynamic Range Radiance Maps from Photographs," Proceedings of SIGGRAPH 97, Computer Graphics Proceedings, Annual Conference Series, pp. 369-378 (Aug. 1997, Los Angeles, California). Addison Wesley, Edited by Turner Whitted. ISBN 0-89791-896-7.

Dicarlo, J.M. and Wandell, B. (2000), "Rendering high dynamic range images," in Proc. IS&T/SPIE Electronic Imaging 2000. Image Sensors, vol. 3965, San Jose, CA, pp. 392-401.

Kuang, J., Yamaguchi, H., Johnson, G.M. and Fairchild, M.D. (2004), "Testing HDR image rendering algorithms (Abstract)," in Proc. IS&T/SID Twelfth Color Imaging Conference: Color Science, Systems, and Application, Scottsdale, AR, pp. 315-320.

Durand, F. and Dorsey, J. (2002), "Fast bilateral filtering for the display of high dynamic-range images," in Proc. ACM SIGGRAPH 2002, Annual Conference on Computer Graphics, San Antonia, CA, pp. 257-266.

Kang, S.B., Uyttendaele, M., Winder, S. and Szeliski, R. (2003), "High Dynamic Range Video," ACM Transactions on Graphics 22(3), 319-325.

Brian A. Wandell and Louis D. Silverstein, "The Science of Color," 2003, Elsevier Ltd, Ch. 8 Digital Color Reproduction, pp. 281-316.

* cited by examiner

Two adjacent colors in the hue-saturation color wheel are not adjacent in the wheel after pixel based color enhancement The block diagram of two-channel decomposition color enhancement (x,y): the center of the filtered area
I(x,y): input pixel value at (x,y)
$I_{LP}(x,y)$: output pixel value of LPF at (x,y)

The block diagram of non-linear sigma filter (Equation (1))

Illustration of two-channel decomposition color enhancement by images in different stages.

METHOD FOR REDUCING ENHANCEMENT OF ARTIFACTS AND NOISE IN IMAGE COLOR ENHANCEMENT

CROSS-REFERENCE TO RELATED APPLICATIONS

This application claims the benefit of U.S. Provisional App. No. 60/762,205, filed Jan. 24, 2006.

BACKGROUND OF THE INVENTION

The present invention relates to image enhancement.

The HSV (hue, saturation, value), or HSB (hue, saturation, brightness) model of the color space model facilitates a more intuitive modification of the colors of an image than changing the colors of an image based directly upon the modification of three primary colors model, i.e. R, G, and B. The RGB color space has the shape of a cube while the HSV color space has the shape of a hexagonal cone. The HSV cone is a non-linear transformation of the RGB cube and at times it is referred to as a perceptual model. 'Perceptual' means the attributes that are more akin to the way in which human-beings think of color.

HSV model facilitates modification of the range or gamut of an RGB display device using the perceptually based variables, i.e. hue, saturation and value/brightness. The HSV model is based on polar coordinates (r, e, z) rather than Cartesians coordinates used in the RGB model. Hue, or tint or tone, is represented as an angle about the z axis, ranging from 0° through 360°. Vertices of the hexagon are separated by 60° increment. Red is at H=0°, Yellow at H=60°, Green at H=120°, and Cyan at H=180°. Complementary colors are 180° spaced apart from each other. Distance from the z axis represents saturation (S): the amount of color present. S varies from 0 to 1. It is represented in this model as the ratio of the purity of a hue. S=1 represents maximum purity of this hue. A hue is said to be one-quarter purity at S=0.25. At S=0, the gray scale is resulted. V, value of HSV, varies from 0 at the apex of the hexcone to 1 at the bottom of the hexcone. V=0 represents blackness. With V=1, color has his maximum intensity. When V=1 and S=1, we have the pure hue. Whiteness is obtained at the location of V=1 and S=0.

Most existing current color enhancement techniques typically boosts saturation of colors while keeping the colors' hue substantially unchanged. In the hue-saturation color wheel such as the one shown in FIG. 1, a typical color enhancement technique moves colors outward on the radial direction as shown by the arrows. Essentially, the color enhancement algorithm increases the input images' dynamic range by increasing the saturation of the pixels.

The techniques used to enhance the color enhancement of an image are based upon modification of individual pixels. When the color of a pixel is enhanced to a new color, the conversion from the old color to the new color for each pixel is a predetermined fixed adjustment for the entire image or for the entire video.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
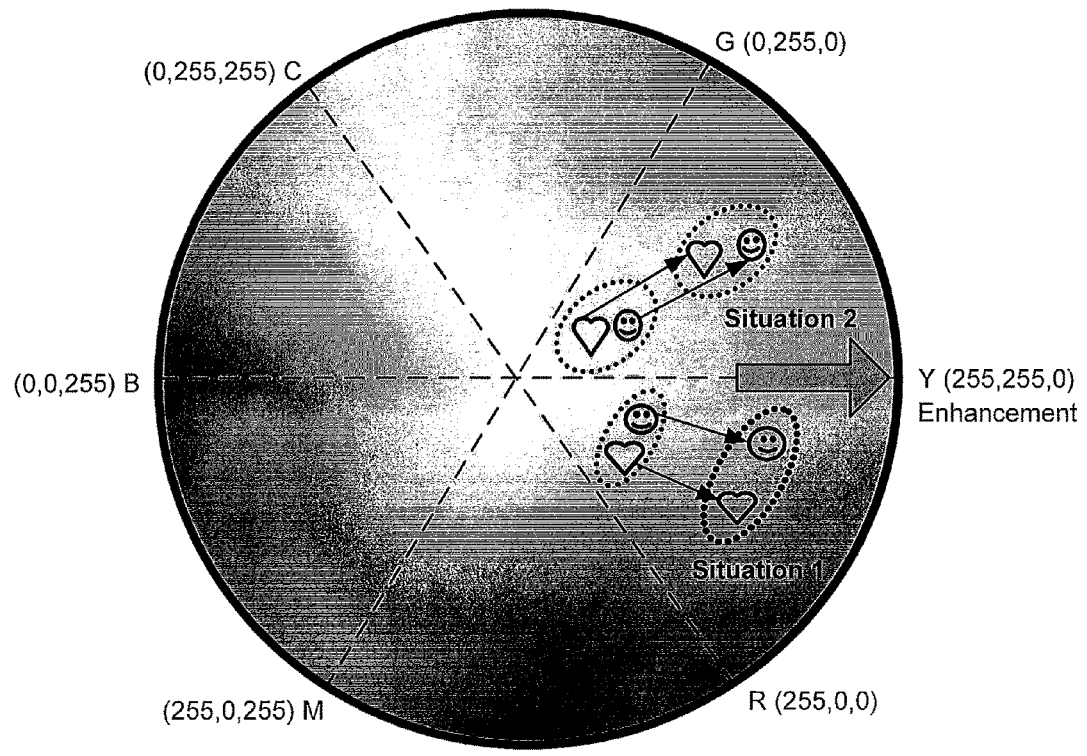
FIG. 1 illustrates two adjacent colors in the hue-saturation color wheel that are not adjacent in the wheel after pixel based color enhancement.

An observation was made that a typical pixel based color enhancement technique results in two similar colors before enhancement being modified to different values that are significantly less similar after enhancement. FIG. 1 illustrates two different situations. Situation 1 illustrates the case when two colors are similar but have different hues, and situation 2 illustrates the case when two colors have the same hue and similar saturations.

In both situations, the two colors are close to each other in the color wheel before color enhancement. The two colors are spaced significantly apart from each other in the color wheel after color enhancement, indicating that the two enhanced colors are less similar after enhancement than they were before enhancement.

Single pixel-based color enhancement techniques also enhance artifacts while it enhances colors. The pixels in spatial flat areas of the non-enhanced image tend to have similar colors, and the differences among the similar colors are not very visible to the viewer. Because the pixel-based color enhancement techniques enlarge the differences of similar colors, the resulting differences of the enhanced image may become very visible, and consequently a flat area of the image before enhancement may not be very flat anymore after enhancement. Specifically, pixel-based color enhancement techniques are prone to amplifying noise that is otherwise generally unobservable in the flat area to become readily observable after color enhancement. Also, the pixel-based color enhancement technique tends to amplify and generate quantization artifacts in the smooth regions before enhancement that become relatively rough after enhancement. In addition, amplifying compression artifacts that are generally unobservable in the non-enhanced image become generally noticeable after enhancement. The compression artifacts include, for example, contours, which are typically due to insufficient bit-depth, blocky artifacts, which are common for block-based compression schemes, and ringing artifacts, which are due to loss of high frequency caused by compression.

In order to reduce the artifacts resulting from image enhancement, a modified technique may incorporate spatial information with the color enhancement. In addition, the spatial information may be obtained using multi-channel or two-channel decomposition of the image. More specifically, the preferred technique may decomposes an image into a base image and a residual image. The base image may incorporate a pixel-based color enhancement technique. The color enhanced base image and the non-enhanced residual image are then combined back into a single image.

The color enhancement technique for the base image results in an increased dynamic range for an image, and as a result tends to increase the noise and artifacts that are in the image, which are generally not observable at the lower dynamic range. Accordingly, it is desirable to reduce the generation of artifacts while enhancing the color of the image with an increased dynamic range. While decreasing the generation of artifacts in the increased dynamic range image, the technique should also preserve image details which are generally high frequency in nature and akin to 'noise'.

The preferred two-channel decomposition incorporates on a nonlinear sigma filter to identify different regions of the image having different characteristics. The base image generated by the sigma filter contains low frequency flat areas that are separated by sharp edges. A different technique would generate the base image by using a linear lowpass filter so that the image contains primarily a blurred image having low frequency components. In the preferred technique, although sharp edges, details, noise and artifacts contains a lot of high frequency components that could result in artifacts by color enhancements, it has been determined that it is generally preferably to have the sharp edges in the base image and have the details, noise, and artifacts in the residual image.

Figure 2:
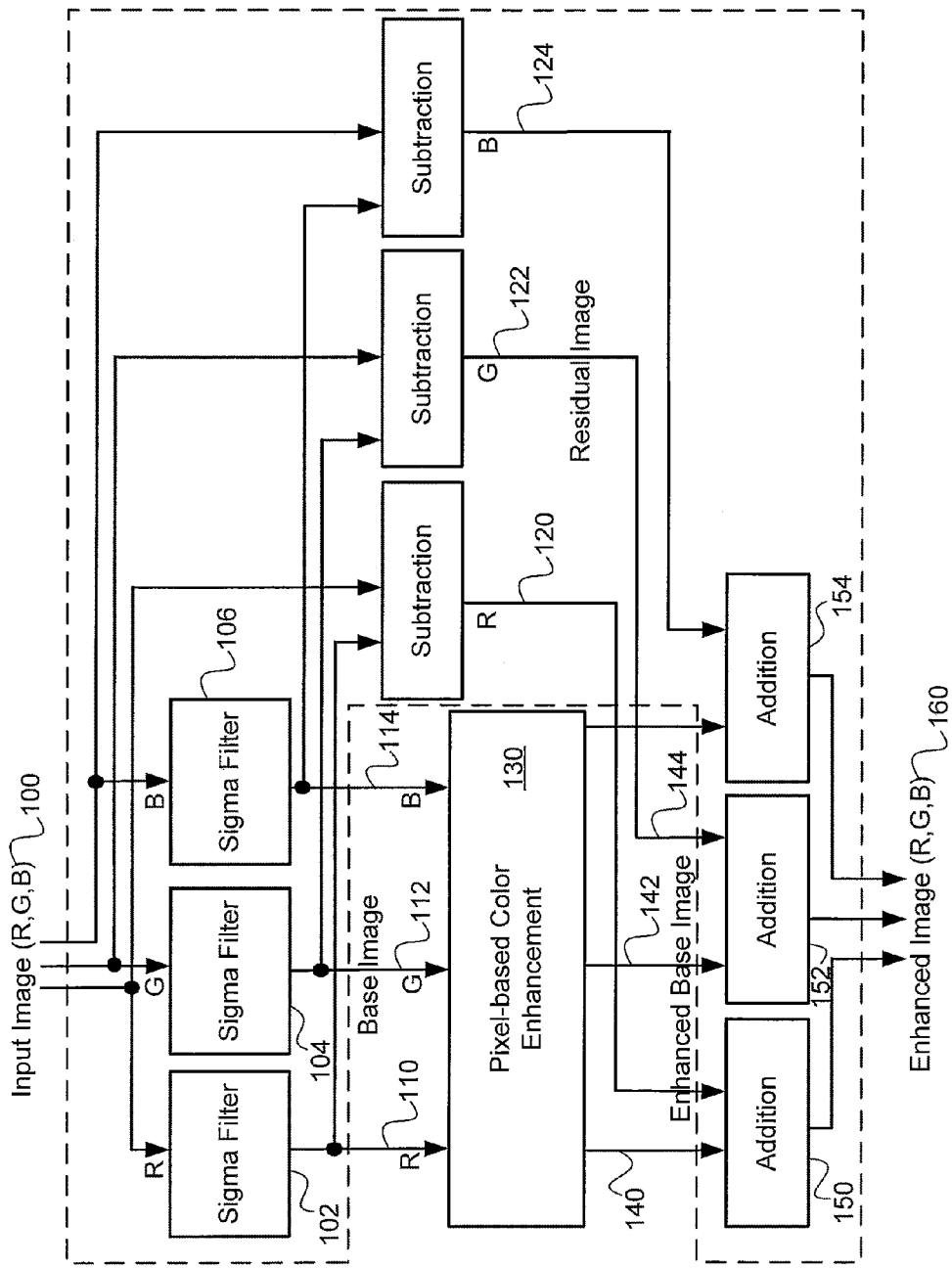
FIG. 2 illustrates a block diagram of two-channel decomposition color enhancement.

To reduce the artifacts from pixel-based enhancement approaches, the proposed approach uses spatial information in the image. The block-diagram of the preferred technique is shown in FIG. 2 As shown in FIG. 2, a color input image 100 typically has three color components, R, G, and B. The nonlinear sigma filter 102, 104, 106 (may be a single sigma filter or multiple sigma filters) is applied to each component of the image separately resulting in the base image 110, 112, 114 for each of the color components. Because the differences with their neighbors of noise, artifacts as well as details are usually below the threshold, noise, artifacts and details are smoothed out by the sigma filter, and they do not substantially exist in the base image. The residual image for each color channel 120, 122, 124 is obtained by subtracting the base image 110, 112, 114 from the components of the input image 110. The residual image contains details, noise, and artifacts. Because the residual image contains noise and artifacts and does not go through the color enhancement path, the noise and artifacts are not enhanced as the pixel-based enhancement. The base image contains low frequency flat areas and sharp edges as well. A pixel-based color enhancement 130 is applied to the base image components, and preferably in a joint manner rather than the components individually, to create an enhanced base image 140, 142, 144. Any pixel-based color enhancement technique may be used. The residual image 120, 122, 124 and the enhanced base image 140, 142, 144 are combined by addition 150, 152, 154 to obtain an enhanced image 160.

In summary, as it may be observed, the input image is decomposed into the base image and residual image. The decomposition preferably uses the nonlinear sigma filter. Then the base image goes through the pixel-based color enhancement. The residual image does not go through the same color enhancement, so the noise and artifacts are not enhanced or amplified in the same manner. Then the enhanced base image and the non-enhanced residual image are combined.

The base image is preferably generated using a sigma filter. A sigma filter is designed to be a lowpass filter but also preserve sharp edges. One suitable sigma filter is disclosed by Lee (J. S. Lee, "Digital image enhancement and noise filtering by use of local statistics," in *IEEE Trans. Pattern Analysis and Machine Intelligence*, Vol. PAMI-2, No. 2, pp. 165-168, March, 1980). The sigma filter utilizes a 1-D or 2-D rectangular window, where the current pixel I(x,y) is at the center of the window. The sigma filter compares all the pixels I(i,j) in the window with the central pixel I(x,y). The sigma filter averages those pixels whose value differences with the central pixel I(x,y) is within a threshold T. Because this filter drops pixels that are not within the threshold, one may refer to this as a sigma filter. Because a sigma filter cannot satisfy the conditions of linear filter, it is a nonlinear filter. Mathematically, the output of the sigma filter, $I_{LP}(x,y)$, is calculated by:

$$I_{LP}(x, y) = \frac{\sum_{(i,j) \in E \, \& \, |I(i,j)-I(x,y)|<T} I(i, j)}{N(x, y)} \quad (1)$$

where E is the window; N(x,y) is the count of the pixels in E that satisfy the condition of $|I(i,j)-I(x,y)|<T$.

Figure 3:
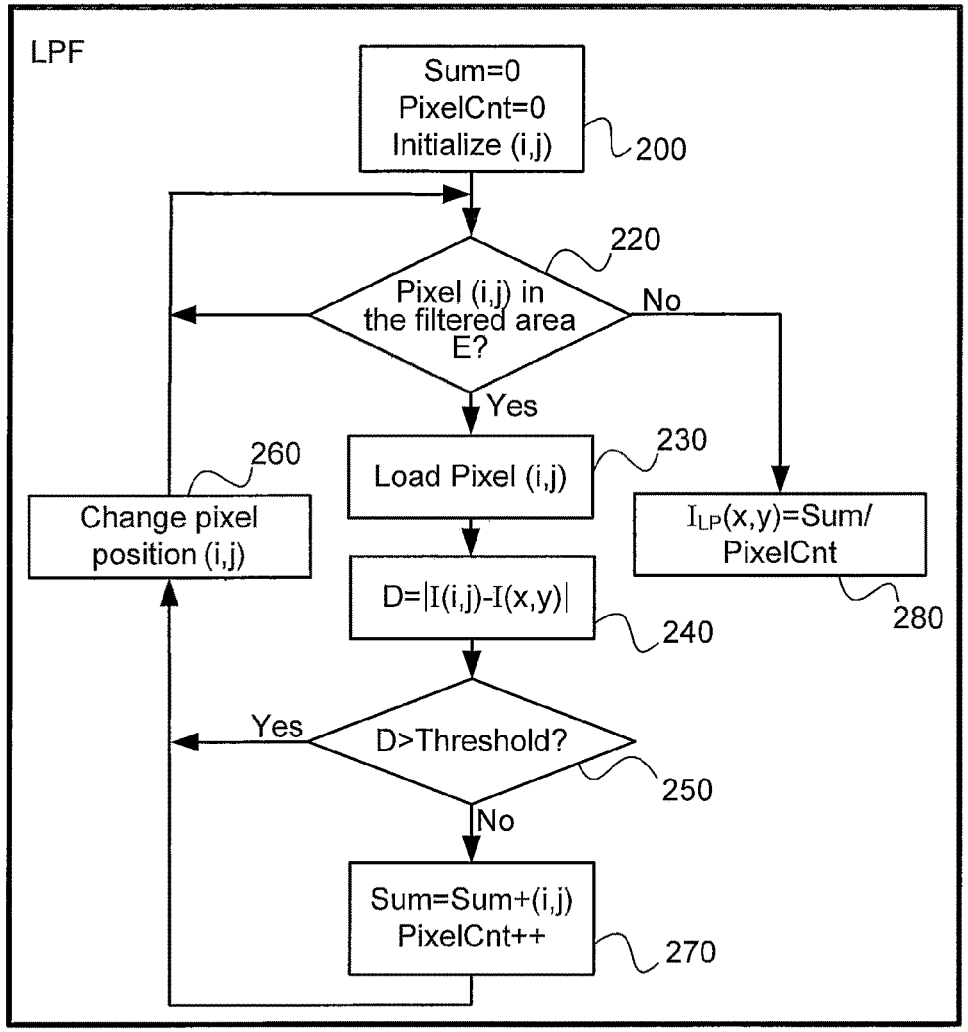
FIG. 3 illustrates a block-diagram of a non-linear sigma filter.
Figure 3:
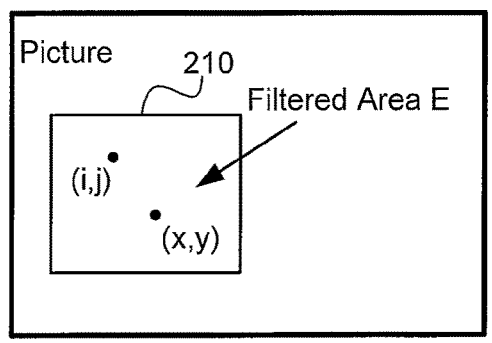

A block-diagram of a sigma filter is shown in FIG. 3. The threshold can be determined by presetting or learning based on the local information. Learning can use histogram of the window. A summation variable ("sum") is set to zero, a pixel count variable ("PixelCnt") is set to zero, and the indices are initialized ("Initialize (i,j)") at block 200. Filtered areas E are defined, as illustrated 210. If the pixel (i,j) is in the filtered area E 220 then the value of the pixel at (i,j) is loaded at 230. The loaded pixel at 230 is compared against the value of the pixel at the center of the filtered area E 210 at block 240 to obtain "D". If D is greater than a threshold at block 250, then the pixel value at (i,j) and (x,y) are sufficiently non-similar and the pixel position is changed at block 260. If D is less than a threshold at block 250, then the pixel value at (i,j) and (x,y) indicative of a flat region of the image, and the sum variable is incremented with the pixel value and the PixelCnt is increased at block 270. After block 270, the pixel position is changed at block 260. Control is passed back to block 220 to check the next pixel to determine if it is in the filtered area E 210. After all (or a selected number of) the pixels in the filtered area have been processed, then block 280 averages the pixel intensity by dividing the summation of the pixels by the total number of sufficiently similar pixels ("PixelCnt"). The process is repeated for all of a selected set of pixels of the image.

Because of its nonlinearity, the sigma filter is able to smooth similar colors, while not smearing very different colors. Therefore, the base image contains many flat areas while the boundaries are still clear. The residual image contains the differences of spatially and chromatically close pixels, which is corresponding to details, noises and artifacts. Because only the base image goes through the enhancement, and the residual images is added back, the details, noises and artifacts are not enhanced.

Figure 4:
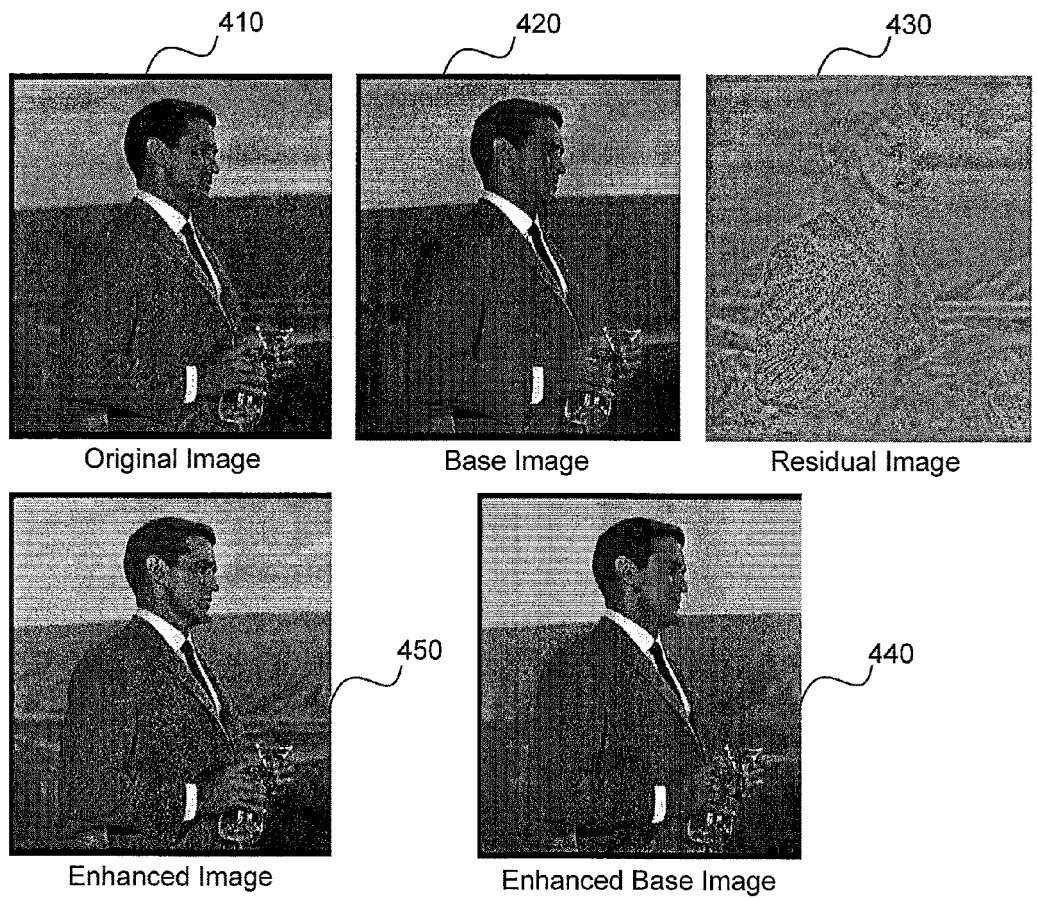
FIG. 4 illustrates a two channel decomposition color enhancement by images indifferent stages.

The proposed technique is further illustrated in FIG. 4. The original image 410 has all of the image details. The base image 420 has primarily lower frequency content and edge content. The residual image 430 contains mostly high frequency detailed content, noise, and artifacts. The enhanced base image 440 has modified pixel values and an increased dynamic range. The resulting enhanced image 450 has an enhanced color with increased dynamic range while not enhancing the artifacts.

Figure 5:
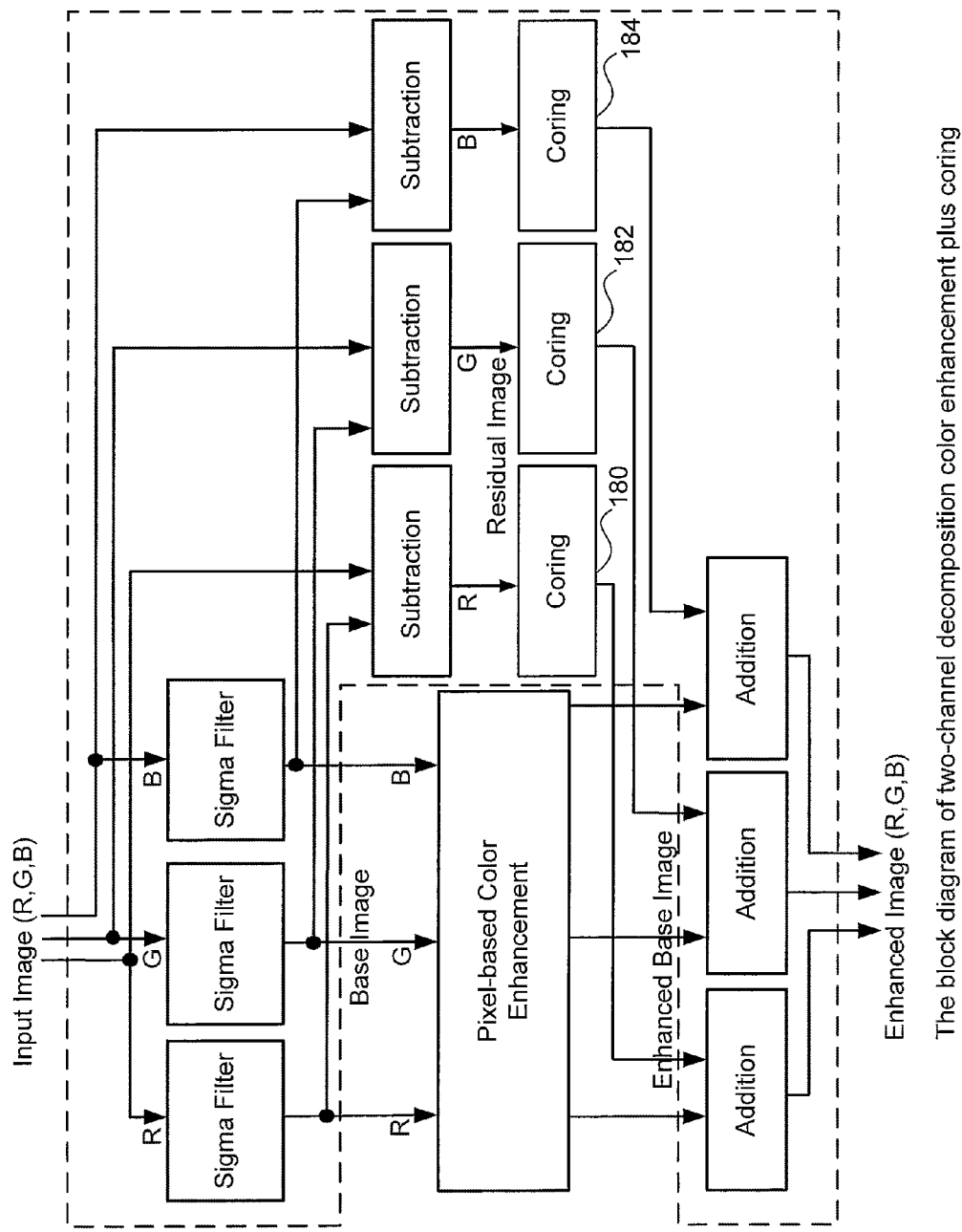
FIG. 5 illustrates a block diagram of two channel decomposition color enhancement plus coring.

As an embodiment, the proposed technique can be combined with decontouring techniques to save hardware cost. The decontouring technique is designed for removing contouring artifacts. It may also use the sigma filter-based two channel decomposition. The coring 180, 182, 184 is applied to the residual image, which is complimentary to the enhancement algorithm. The block-diagram of the combined technique is shown in FIG. 5.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method for enhancing the color of an image to be displayed on a display comprising:
   (a) receiving an image having a plurality of pixels where each of said pixels has a plurality of color components and decomposing said image into a low-frequency base image and a high-frequency residual image using a non-linear sigma filter that assigns sharp edges in said image to said base image, where said sigma filter is separately applied to each of said plurality of color components;
   (b) modifying said base image with a pixel-based filter, after said image has been decomposed into said base image and said residual image, where said pixel-based filter increases the dynamic range of colors in said base image such that the difference between different colors is increased, and not modifying said residual image using pixel-based filter, where said pixel-based filter is jointly applied to at least two of said plurality of color components;
   (c) modifying said residual image with a coring filter, and not modifying said base image with said coring filter;
   (d) recombining the modified said base image with the modified said residual image to obtain a modified image; and
   (e) displaying said modified image on said display.

2. The method of claim 1 wherein said pixel-based filter is applied jointly, rather than individually, to the respective color components of said base image.

3. The method of claim 1 wherein said lower frequency content includes sharp edges.

4. The method of claim 1 wherein said sigma filter applies a threshold having a value based upon data from said image.

5. The method of claim 1 wherein said coring filter is applied separately to the respective color components of said residual image.

6. The method of claim 1 wherein said higher frequency content includes high frequency details, noise, and artifacts.

7. A method for enhancing the color of an image to be displayed on a display comprising:
   (a) receiving an image having a plurality of pixels where each of said pixels has a plurality of color components;
   (b) filtering each of said color components of said plurality of components with a sigma filter to obtain a base image wherein said base image is characterized by having edge content and otherwise primarily low frequency components of said image, where said sigma filter is separately applied to each of said plurality of color components;
   (c) modifying said input image using said base image to obtain a residual image wherein said residual image is characterized by having primarily high frequency components of said image;
   (d) filtering said base image with a pixel-based color enhancement technique, after said image has been separated into said base image and said residual image, to obtain an enhanced base image in such a manner that the dynamic range of colors in said base image is increased such that the difference between different colors is enhanced, where said color enhancement technique is jointly applied to at least two of said plurality of color components;
   (e) modifying said enhanced base image based upon said residual image to obtain an enhanced image that includes said high frequency content of said image; and
   (f) displaying said modified image on said display.

8. The method of claim 7 wherein said residual image is further processed using a decontouring technique.

* * * * *